(12) United States Patent
Cheng

(10) Patent No.: US 11,878,625 B2
(45) Date of Patent: Jan. 23, 2024

(54) GROMMET

(71) Applicant: ILLINOIS TOOL WORKS INC., Glenview, IL (US)

(72) Inventor: Wenxu Cheng, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 421 days.

(21) Appl. No.: 17/326,536

(22) Filed: May 21, 2021

(65) Prior Publication Data

US 2021/0362647 A1   Nov. 25, 2021

(30) Foreign Application Priority Data

May 22, 2020 (CN) .......................... 202010442537.9
May 12, 2021 (CN) .......................... 202110515259.X
May 12, 2021 (CN) .......................... 202110515531.4

(51) Int. Cl.
*B60Q 1/26*  (2006.01)
*F16M 13/02*  (2006.01)

(52) U.S. Cl.
CPC .......... *B60Q 1/2653* (2013.01); *F16M 13/02* (2013.01)

(58) Field of Classification Search
CPC .. B60Q 1/2653; B60Q 1/2619; B60Q 1/0088; F16M 13/02
USPC ..... 248/27.1; 16/2.1; 24/713.6, 595.1, 572.1
See application file for complete search history.

(56) References Cited

U.S. PATENT DOCUMENTS

| | | | | |
|---|---|---|---|---|
| 8,240,622 B2 * | 8/2012 | Hohmann | ................ | B60J 10/30 |
| | | | | D8/382 |
| 8,553,399 B2 * | 10/2013 | Su | .......................... | F16M 13/02 |
| | | | | 349/150 |
| 10,315,558 B2 * | 6/2019 | Burton | ................... | B60Q 1/263 |
| 11,577,672 B2 * | 2/2023 | Narita | ................. | B60R 16/0222 |
| 2012/0102687 A1 * | 5/2012 | Hasegawa | ............. | F16B 21/086 |
| | | | | 24/595.1 |
| 2014/0183309 A1 * | 7/2014 | Pasho | ................. | A47G 23/0225 |
| | | | | 248/315 |
| 2015/0117050 A1 * | 4/2015 | Burton | ................. | B60Q 1/2638 |
| | | | | 29/525.01 |
| 2016/0305458 A1 * | 10/2016 | Burton | ................. | B60Q 1/2626 |

* cited by examiner

*Primary Examiner* — Todd M Epps
(74) *Attorney, Agent, or Firm* — Quarles & Brady LLP

(57) ABSTRACT

A grommet that comprises a main body, a cavity, an outer wall, a pair of windows, a pair of support legs and a neck ring. The main body extends along an axis of the grommet. The cavity is recessed downward from an upper surface of the main body along the axis. A first channel is formed between a first outer wall portion and a first side face of the main body, and a second channel is formed between a second outer wall portion and a second side face of the main body. The pair of windows are respectively provided in the first outer wall portion and the second outer wall portion and are respectively in communication with the first channel and the second channel. The pair of support legs are respectively connected to lower edges of the pair of windows through bottoms thereof.

9 Claims, 17 Drawing Sheets

GROMMET

CROSS REFERENCE TO RELATED APPLICATIONS

This application claims priority to Chinese Patent Application No. 202010442537.9, filed on May 22, 2020, Chinese Patent Application No. 202110515531.4, filed on May 12, 2021, and Chinese Patent Application No. 202110515259.X, filed on May 12, 2021, each of which is incorporated by reference herein in its entirety.

TECHNICAL FIELD

The present application relates to a connector, and in particular to a grommet.

BACKGROUND

A car lamp is usually mounted to car body sheet metal of a car through a grommet. Particularly, the grommet comprises a main body, support legs and a neck ring. The support legs and the neck ring are provided on the main body at a certain interval. One end of the grommet may pass through a hole on the car body sheet metal, thereby keeping the car body sheet metal between the support legs and the neck ring. The other end of the grommet is provided with a mounting hole to be connected to the car lamp. However, the support legs of the existing grommet usually have high strength. The support legs of the grommet will damage the car body sheet metal when passing through the car body sheet metal, resulting in a failure of sealing between the grommet and the car body sheet metal.

SUMMARY OF THE DISCLOSURE

A grommet provided by the present application may at least partially solve the above technical problem. A first aspect of the present application provides a grommet, which comprises a main body, a cavity, a pair of windows, a pair of support legs, a neck ring and a pair of filling portions. The cavity is recessed downward from an upper surface of the main body. The pair of windows are provided in side walls of the main body and are in communication with the cavity. The pair of support legs are respectively connected to lower edges of the pair of windows through the bottoms thereof. The neck ring extends outward from an upper portion of the main body, and the neck ring is located above the pair of windows and the pair of support legs. The pair of filling portions respectively fill a pair of gaps between the pair of support legs and the corresponding windows, and connect the pair of support legs to the corresponding pair of windows. The pair of filling portions are elastic such that the pair of support legs have extending position and retracting position, and the pair may move between the extending position and the retracting position. The pair of support legs are configured such that the tops of the pair of support legs are located outside the corresponding windows when the pair of support legs are in the extending position, and the pair of support legs are respectively contained in the pair of windows when the pair of support legs are in the retracting position.

According to the grommet in the first aspect, the pair of support legs are configured such that the pair of support legs obliquely extend upward and outward with respect to the main body when the pair of support legs are in the extending position.

According to the grommet in the first aspect, the grommet further comprises a cap, wherein the cap is provided around the neck ring, is connected to the neck ring and is provided with a sealing edge at a free end thereof.

According to the grommet in the first aspect, the sealing edge is lower than the tops of the pair of support legs.

According to the grommet in the first aspect, the grommet further comprises a pair of connection portions, wherein the pair of connection portions respectively connect the pair of filling portions to the cap.

According to the grommet in the first aspect, the main body, the pair of support legs and the neck ring are integrally molded with a first material to form a first grommet portion; the pair of filling portions, the cap and the pair of connection portions are integrally molded with a second material to form a second grommet portion; and the second grommet portion is molded to the first grommet portion to form the grommet.

According to the grommet in the first aspect, each of the pair of windows comprises an upper edge and a lower edge which are oppositely provided and a left edge and a right edge which are oppositely provided, wherein the upper edge is restricted by a lower surface of the neck ring, the left edge and the right edge are restricted by the main body, and the pair of support legs are connected to a pair of the lower edges.

According to the grommet in the first aspect, the pair of windows and the pair of support legs are symmetrically provided with respect to an axis of the grommet.

According to the grommet in the first aspect, the grommet is used for being mounted to car body sheet metal. The car body sheet metal is provided with a round hole. The grommet is configured such that a distance between the tops of the pair of support legs is greater than the diameter of the round hole when the pair of support legs are in the extending position, and a distance between the tops of the pair of support legs is less than or equal to the diameter of the round hole when the pair of support legs are in the retracting position.

According to the grommet in the first aspect, the grommet is configured such that the car body sheet metal is sandwiched between the neck ring and the support legs when the grommet is mounted in place on the car body sheet metal.

A second aspect of the present application further provides a grommet, which comprises a main body, a cavity, an outer wall, a pair of windows, a pair of support legs and a neck ring. The main body extends along an axis of the grommet. The cavity is recessed downward from an upper surface of the main body along the axis. The outer wall is provided around the main body and is provided with a first outer wall portion and a second outer wall portion which are respectively located outside a first side face and a second side face opposite each other of the main body, a first channel is formed between the first outer wall portion and the first side face of the main body, and a second channel is formed between the second outer wall portion and the second side face of the main body. The pair of windows are respectively provided in the first outer wall portion and the second outer wall portion and are respectively in communication with the first channel and the second channel. The pair of support legs are respectively connected to lower edges of the pair of windows through the bottoms thereof. The neck ring is provided around the main body, and extends outward from the top of the main body, and the neck ring is located above the pair of windows and the pair of support legs. The pair of support legs have extending position and retracting position, the pair of support legs may move between the extending position and the retracting position, and the pair of support legs are configured such that the tops of the pair of support legs are located outside the corresponding windows when the pair of support legs are in the extending position, and the pair of support legs are respectively contained in the pair of windows when the pair of support legs are in the retracting position.

According to the grommet in the second aspect, the pair of support legs are configured such that the pair of support legs obliquely extend upward and outward with respect to the main body when the pair of support legs are in the extending position.

According to the grommet in the second aspect, the grommet further comprises a cap, wherein the cap is provided around the neck ring, is connected to the neck ring and is provided with a sealing edge at a free end thereof.

According to the grommet in the second aspect, the sealing edge is lower than the tops of the pair of support legs.

According to the grommet in the second aspect, the main body, the outer wall, the pair of support legs and the neck ring are integrally molded with a first material.

According to the grommet in the second aspect, the cap is integrally molded with a second material. The cap is molded to the main body, and forms the grommet together with the outer wall, the pair of support legs and the neck ring.

According to the grommet in the second aspect, the pair of windows and the pair of support legs are symmetrically provided with respect to the axis of the grommet respectively.

According to the grommet in the second aspect, the grommet is used for being mounted to car body sheet metal. The car body sheet metal is provided with a round hole. The grommet is configured such that a distance between the tops of the pair of support legs is greater than the diameter of the round hole when the pair of support legs are in the extending position, and a distance between the tops of the pair of support legs is less than or equal to the diameter of the round hole when the pair of support legs are in the retracting position.

According to the grommet in the second aspect, the grommet is configured such that the car body sheet metal is sandwiched between the neck ring and the support legs when the grommet is mounted in place on the car body sheet metal.

The above grommets in the first aspect and in the second aspect both may realize a good sealing performance.

The concept, specific structures and resulting technical effects of the present application are further described below in conjunction with the accompanying drawings so as to fully understand the objective, features and effects of the present application.

BRIEF DESCRIPTION OF THE DRAWINGS

The present application will be understood more easily when the following detailed description is read in conjunction with the accompanying drawings. Throughout the accompanying drawings.

DETAILED DESCRIPTION OF EMBODIMENTS

Various specific embodiments of the present application are described below with reference to the accompanying drawings which constitute part of this description. It should be understood that although the terms indicating orientations, such as "upper", "lower", "left", "right", "inner", "outer", "top" and "bottom", and so on are used in the present application to describe structural parts and elements in various examples of the present application, these terms are used herein only for ease of description and are determined based on the exemplary orientations as shown in the accompanying drawings. Since the embodiments disclosed in the present application can be arranged in different directions, these terms indicating directions are merely illustrative and should not be considered as limitations.

The ordinal numbers such as "first" and "second", and so on used in the present application are merely used to distinguish and identify, and do not have any other meanings. Unless otherwise specified, the ordinal numbers neither indicate a specific order, nor have a specific relevance. For example, the term "first grommet portion" itself does not imply the existence of "second grommet portion", nor does the term "second grommet portion" itself imply the existence of "first grommet portion".

Figure 1A:
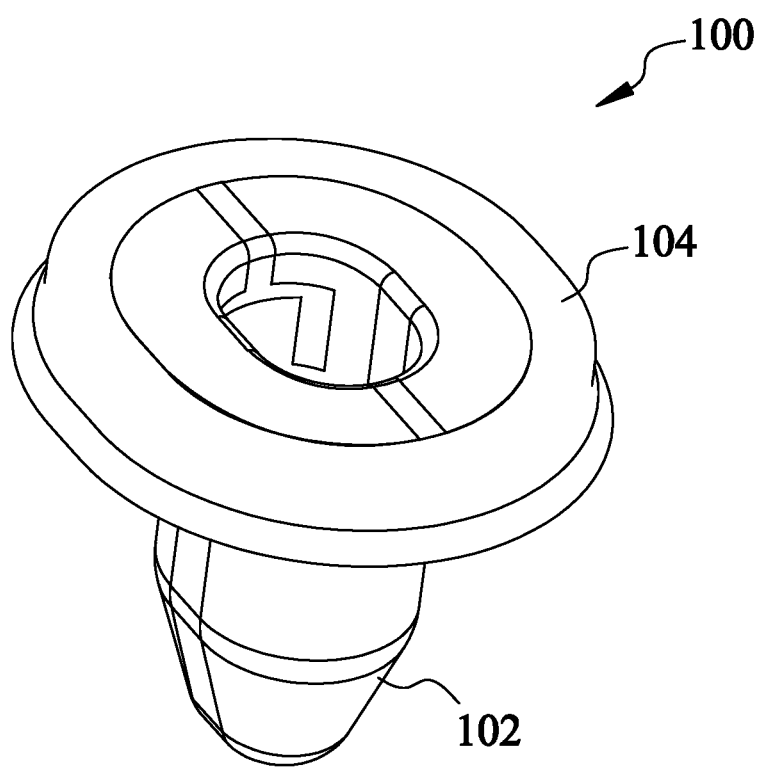
FIG. 1A is a top perspective view of a grommet of a first embodiment of the present application.
Figure 1B:
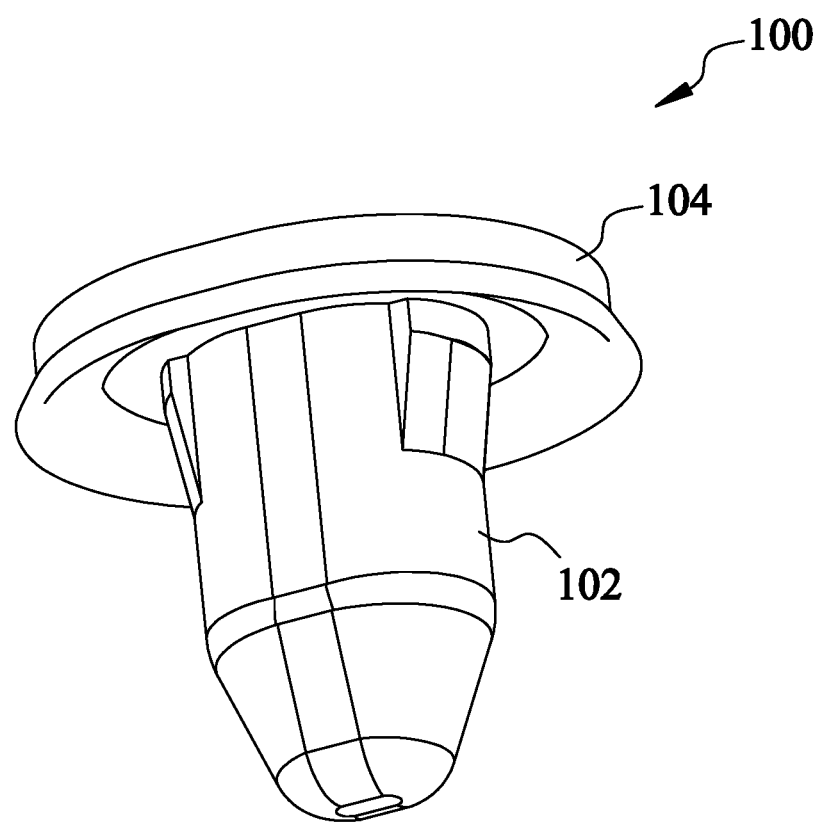
FIG. 1B is a bottom perspective view of the grommet shown in FIG. 1A.

FIG. 1A is a top perspective view of a grommet 100 of a first embodiment of the present application. FIG. 1B is a bottom perspective view of the grommet 100 shown in FIG. 1A. As an example, the grommet 100 may be used to connect a car lamp to car body sheet metal. As shown in FIGS. 1A-1B, the grommet 100 comprises a first grommet portion 102 and a second grommet portion 104. The second grommet portion 104 is approximately provided at an upper portion of the first grommet portion 102. The first grommet portion 102 is integrally molded with a first material, the second grommet portion 104 is integrally molded with a second material, and the second grommet portion 104 is molded to the first grommet portion 102 to form the grommet 100. The second material is elastic. As an example, the first material is plastic and the second material is a TPE material (i.e., a thermoplastic elastomer material).

Figure 2A:
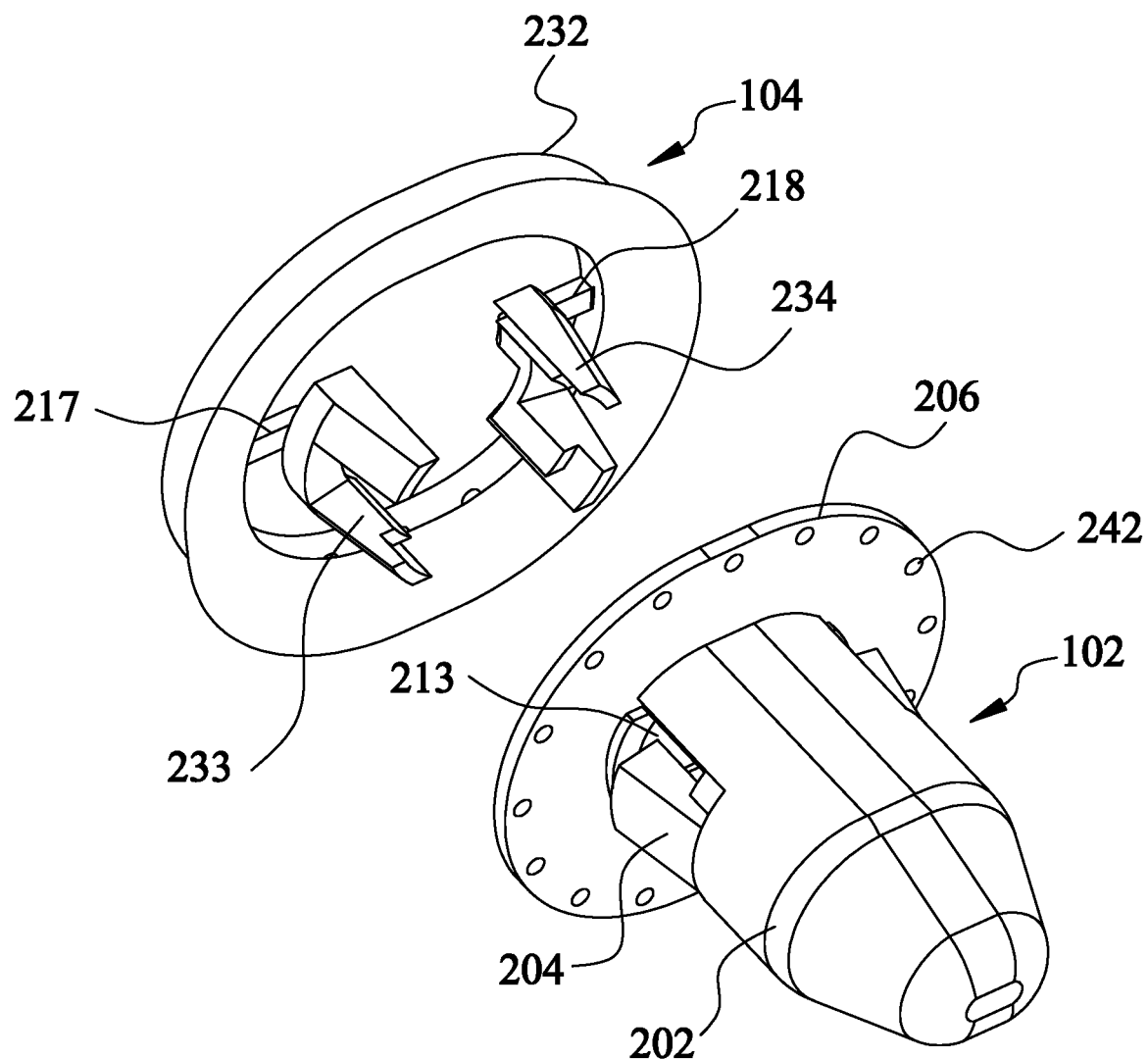
FIG. 2A is an exploded view of the grommet shown in FIG. 1A from a first perspective.
Figure 2B:
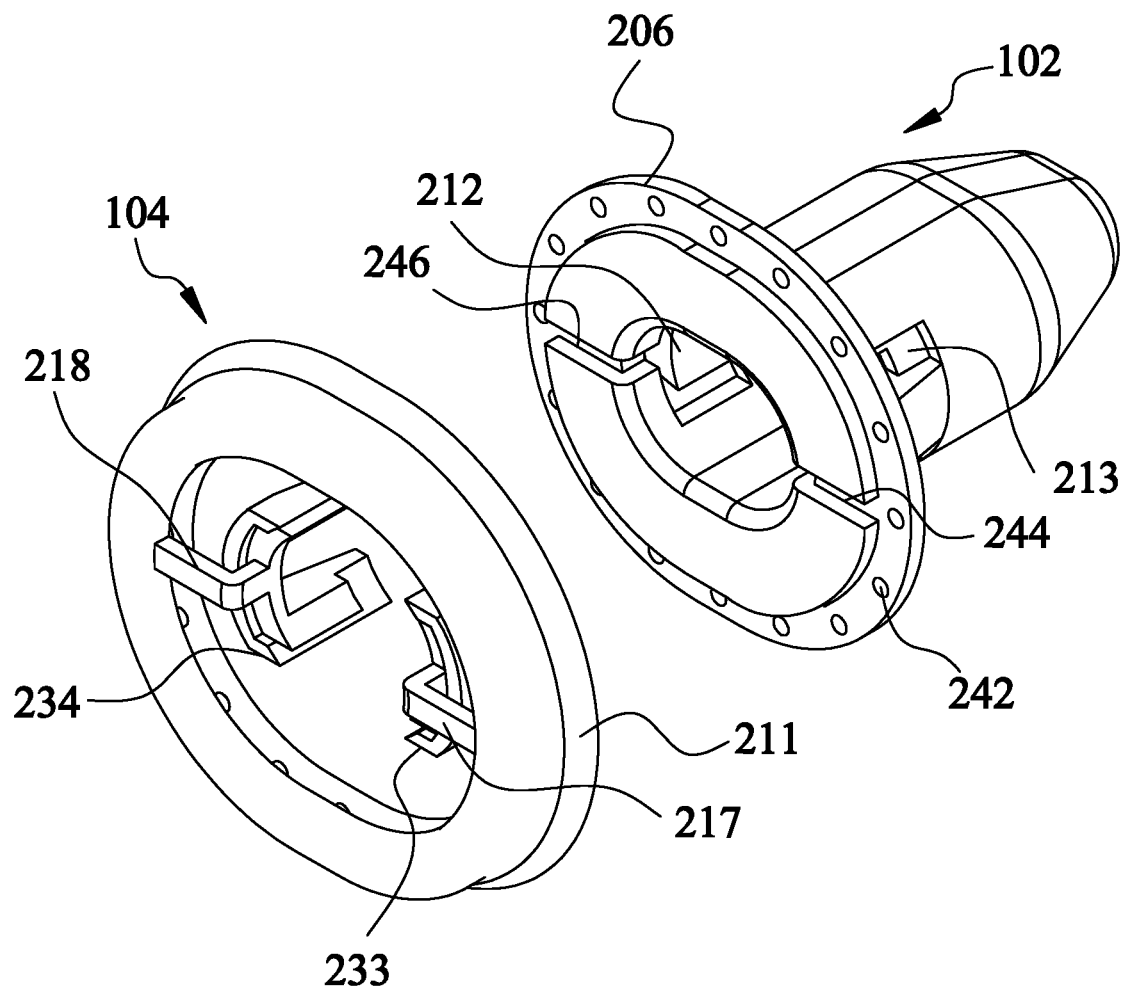
FIG. 2B is an exploded view of the grommet shown in FIG. 1A from a second perspective.
Figure 2C:
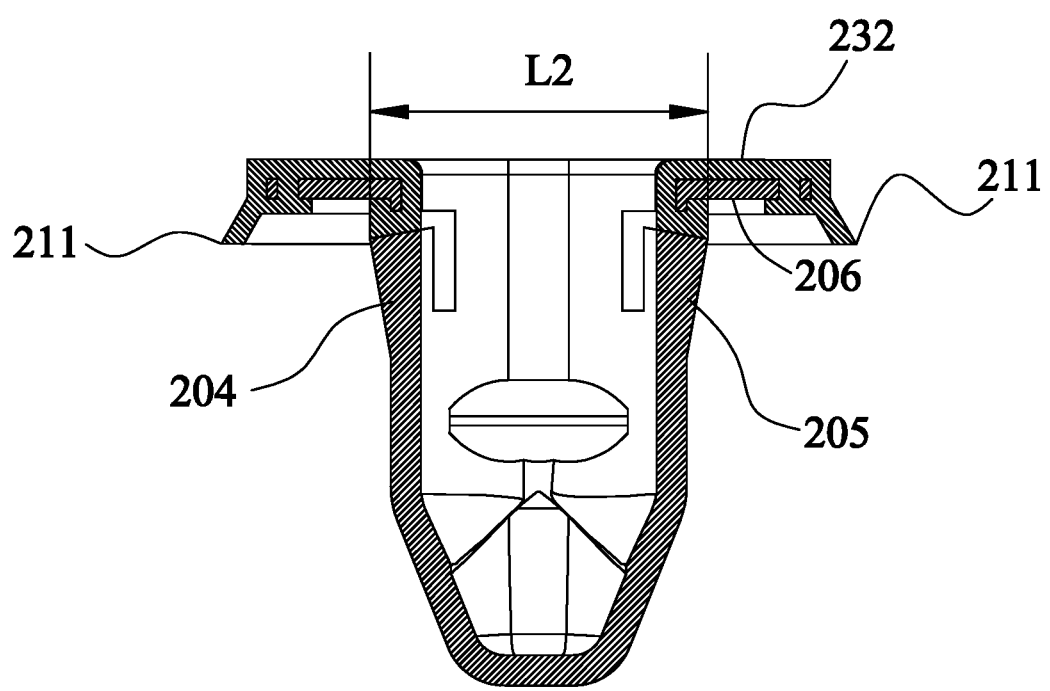
FIG. 2C is a sectional view of the grommet shown in FIG. 1A, in which support legs of the grommet are in extending position.
Figure 2D:
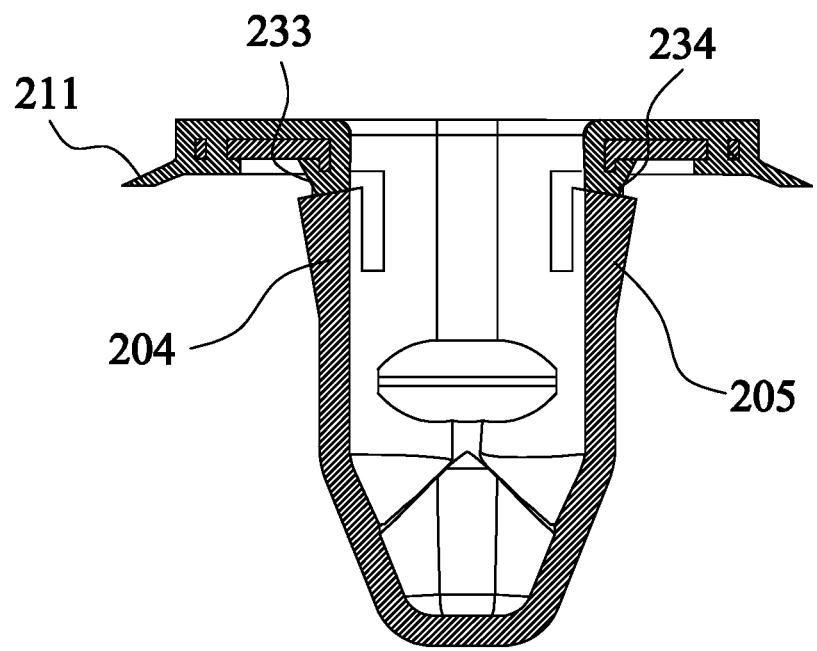
FIG. 2D is a sectional view of the grommet shown in FIG. 1A, in which the support legs of the grommet are in retracting position.

FIG. 2A and FIG. 2B are exploded views of the grommet 100 shown in FIG. 1A from different perspectives respectively, and FIG. 2C and FIG. 2D are sectional views of the grommet 100 shown in FIG. 1A respectively, so as to show a specific structure of the grommet 100. As shown in FIGS. 2A-2D, the first grommet portion 102 comprises a main body 202, a neck ring 206 and a pair of support legs. Specifically, the main body 202 is approximately a cylinder extending in a length direction. A lower portion of the main body tapers so as to guide the main body 202 when mounting to car body sheet metal 401 (see FIGS. 4A-4C). The neck ring 206 horizontally extends outward from an upper portion of the main body 202, and is used for providing support for the second grommet portion 104. An upper surface of the neck ring 206 is provided with a lateral first groove 244 and a lateral second groove 246. The neck ring 206 is provided with multiple through holes 242 which are uniformly distributed along an outer edge of the neck ring 206. The first groove 244, the second groove 246 and the multiple through holes 242 are used to provide a channel for molding the second grommet portion 104 to the first grommet portion 102.

As shown in FIGS. 2A-2B, the grommet 100 comprises a cavity 212 and a pair of windows. The cavity 212 is recessed downward from an upper surface of the main body 202, and is used to be connected to the car lamp (not shown). The main body 202 has an axis extending in a length direction. The pair of windows are provided in side walls of the main body 202 and are in communication with the cavity 212. The pair of support legs respectively correspond to the pair of windows, extend upward and outward from the main body 202, and are used for providing a limit on connection of the grommet 100 to the car body sheet metal 401. The pair of support legs are symmetrically provided with respect to the axis of the main body 202.

Figure 3A:
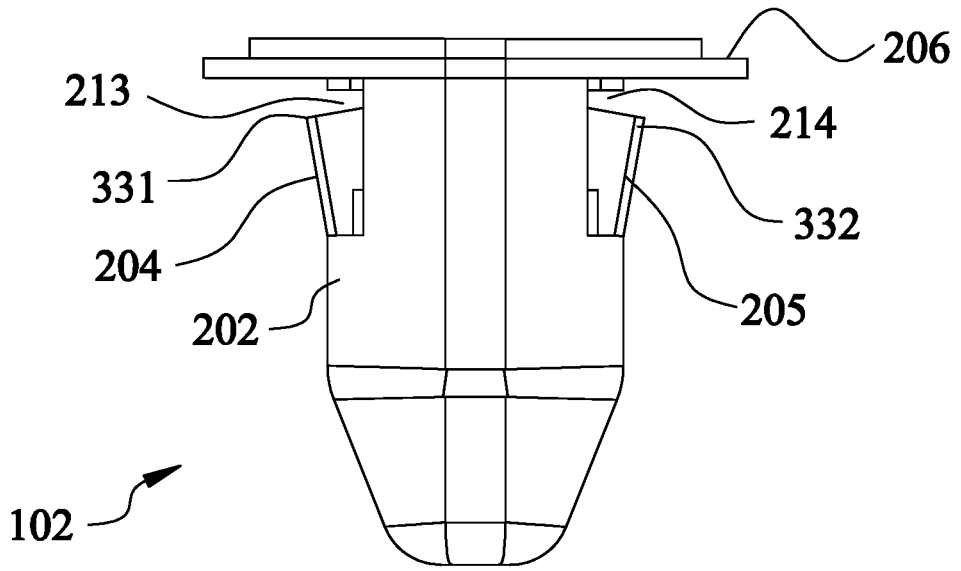
FIG. 3A is a front view of a first grommet portion shown in FIG. 1A.
Figure 3B:
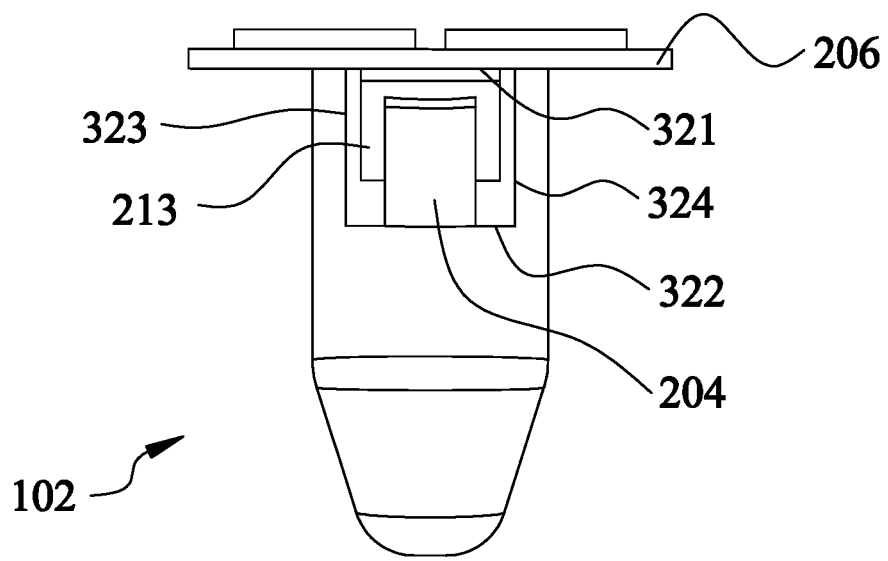
FIG. 3B is a side view of the first grommet portion shown in FIG. 1A.

With reference to FIGS. 3A-3B, a specific structure of the pair of windows and a specific structure of the pair of support legs in the first grommet portion 102 will be described in detail below.

FIG. 3A is a front view of the first grommet portion 102 shown in FIG. 1A. FIG. 3B is a side view of the first grommet portion 102 shown in FIG. 1A. As shown in FIGS. 3A-3B, the pair of windows are a first window 213 and a second window 214. The first window 213 and the second window 214 are respectively provided on two opposite sides of the main body 202 and are symmetrically provided with respect to the main body 202. Each of the first window 213 and the second window 214 comprises an upper edge 321, a lower edge 322, a left edge 323 and a right edge 324. The upper edge 321 and the lower edge 322 are oppositely arranged, and the left edge 323 and the right edge 324 are oppositely arranged. The upper edge 321 is restricted by a lower surface of the neck ring 206. The left edge 323, the right edge 324 and the lower edge 322 are restricted by the main body 202.

The pair of support legs are a first support leg 204 and a second support leg 205. Specifically, the first support leg 204 extends upward and outward (i.e., leftward) out of a portion of the lower edge 322 of the first window 213. An upper end 331 of the first support leg 204 is located below the neck ring 206, and is spaced from the neck ring 206 by a certain distance, such that when the first support leg 204 is bent inward, the first support leg 204 may be contained in the first window 213. There is a gap between the top of the first support leg 204 and the upper edge 321 of the first window 213. Similarly, the second support leg 205 extends upward and outward (i.e., rightward) out of a portion of the lower edge 322 of the second window 214. An upper end 332 of the second support leg 205 is located below the neck ring 206, and is spaced from the neck ring 206 by a certain distance, such that when the second support leg 205 is bent inward, the second support leg 205 may be contained in the second window 214. There is a gap between the top of the first support leg 204 and the upper edge 321 of the second window 214.

Figure 4A:
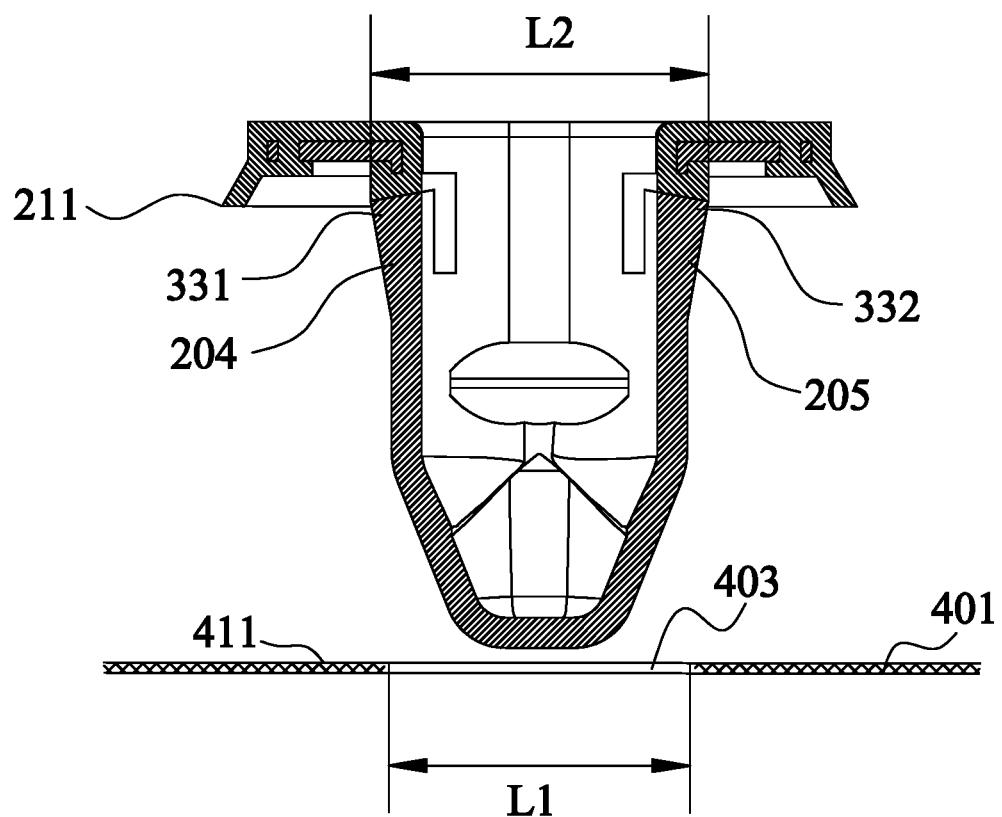
FIG. 4A is a sectional view of mounting the grommet to a car body sheet metal, in which the support legs of the grommet are in the extending position.
Figure 4B:
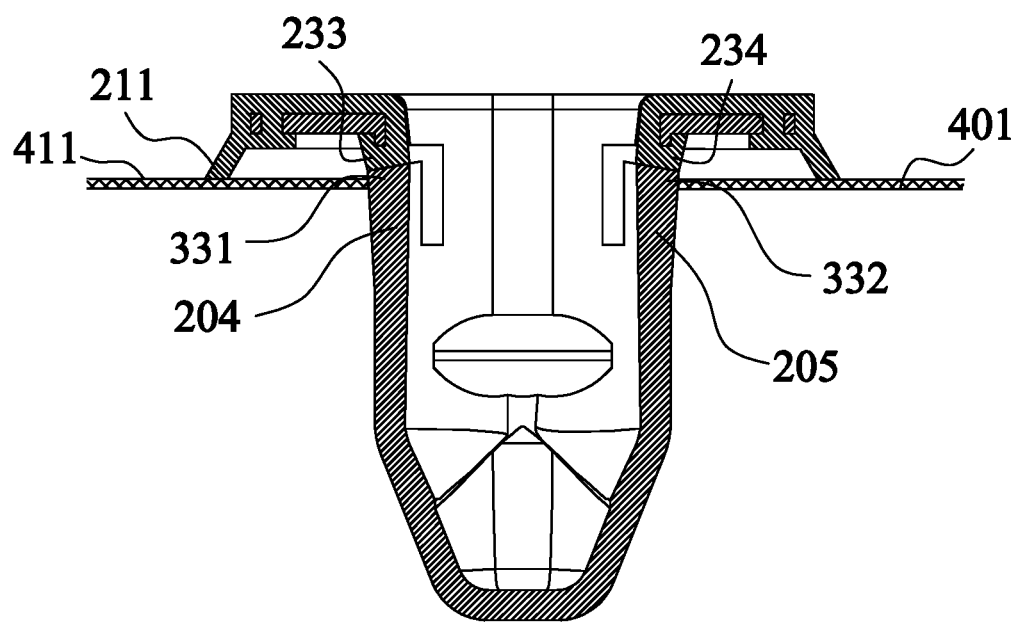
FIG. 4B is a sectional view of mounting the grommet to the car body sheet metal, in which the support legs of the grommet are in the retracting position.
Figure 4C:
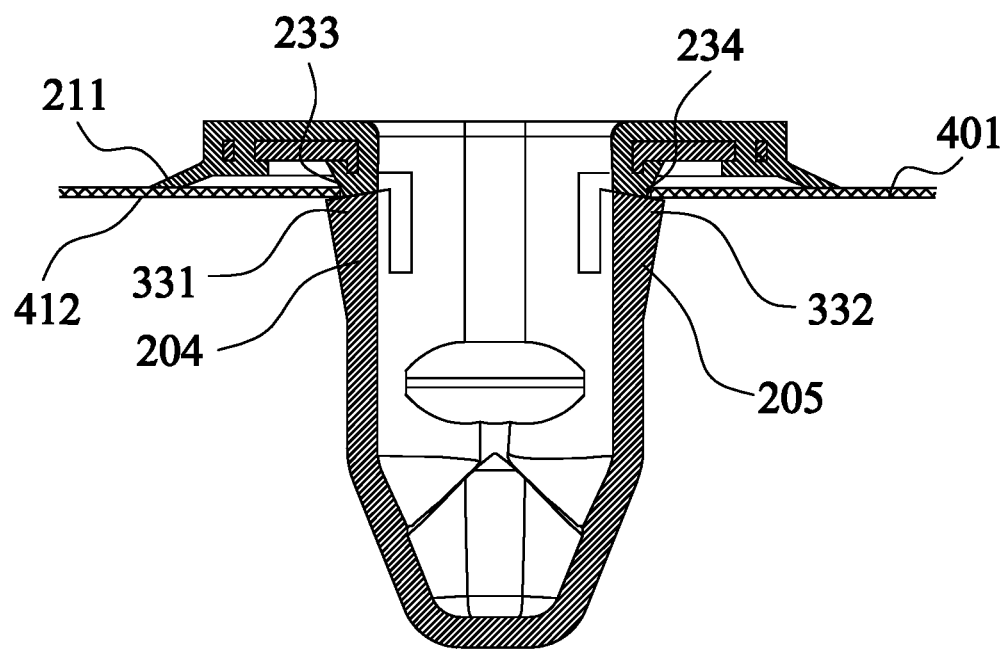
FIG. 4C is a sectional view of the grommet mounted in place on the car body sheet metal and shown in FIG. 1A.

As shown in FIGS. 2C-2D, the pair of support legs have extending position and retracting position, and may move between the extending position and the retracting position. Specifically, when the pair of support legs are not acted by an external force, the pair of support legs are oblique upward and outward with respect to the main body 202 (i.e., at an angle with an outer surface of the main body 202), and at this time, the pair of support legs are in the extending position (as shown in FIG. 2C). When the pair of support legs are acted by an inward external force, the upper end 331 and the upper end 332 of the pair of support legs move inward (i.e., toward the cavity 212). When the pair of support legs are respectively contained in the pair of windows, the pair of support legs are in the retracting position (as shown in FIG. 2D). In addition, when the pair of support legs are no longer acted by the external force, the pair of support legs may move from the retracting position to the extending position. As shown in FIGS. 4A-4C, the car body sheet metal 401 is provided with a round hole 403 for receiving the grommet 100. The diameter of the round hole 403 is equal to a width L1. When the first support leg 204 and the second support leg 205 in the grommet 100 are not acted by the external force and are in the extending position, a distance between the upper end 331 of the first support leg 204 and the upper end 332 of the second support leg 205 is equal to a width L2. The width L1 is smaller than the width L2.

With continued reference to FIGS. 2A-2D, the second grommet portion 104 comprises a cap 232, a pair of filling portions and a pair of connection portions. The cap 232 is provided around the neck ring 206. More specifically, the cap 232 covers an outer edge of the neck ring 206 and extends downward and outward after passing over the outer edge of the neck ring 206 to form a sealing edge 211 at a free end thereof. In a length direction, the sealing edge 211 extending downward of the cap 232 is lower than the upper end 331 and the upper end 332 of the pair of support legs, such that the sealing edge 211 of the cap 232 may abut against an upper surface 411 of the car body sheet metal 401 when the grommet 100 is mounted in place on the car body sheet metal (see FIGS. 4A-4C). The pair of filling portions are a first filling portion 233 and a second filling portion 234. The first filling portion 233 fills the gap between the first window 213 and the first support leg 204, and the second filling portion 234 fills the gap between the second window 214 and the second support leg 205, so as to respectively connect the upper edges 321, the left edges 323 and the right edges 324 of the pair of windows to upper portions, left portions and right portions of the pair of support legs, so that the cavity 212 may not be in communication with the outside of the main body 202 through the gaps between the windows and the support legs. The pair of connection portions comprise a first connection portion 217 and a second connection portion 218. The first connection portion 217 is provided in the first groove 244, thereby connecting the first filling portion 233 to the cap 232. The second connection portion 218 is provided in the second groove 246, thereby connecting the second filling portion 234 to the cap 232.

Therefore, although the main body 202 is provided with the pair of windows, the gaps between the pair of windows and the pair of support legs are filled with the pair of filling portions, such that the cavity 212 in the main body 202 may be merely in communication with the outside through an upper opening. In addition, the pair of filling portions in the present application are made from elastic materials, so when the pair of support legs move between the extending position and the retracting position, the pair of filling portions may deform, but still fill the gaps between the pair of windows and the pair of support legs.

FIGS. 4A-4C are schematic diagrams of a process of mounting the grommet 100 respectively shown in FIG. 1A to the car body sheet metal 401, wherein FIGS. 4A-4C respectively show the sectional views when the pair of support legs are in the extending position, when the pair of support legs are in the retracting position, and when the grommet is mounted in place.

As shown in FIG. 4A, the pair of support legs in the grommet 100 are in the extending position and not acted by the external force. When the grommet 100 is to be fixed to the car body sheet metal 401, a user may place the grommet 100 above the hole 403 such that the grommet is aligned with the hole 403, and apply a downward force to the grommet 100. Since the first support leg 204 and the second support leg 205 are oblique outward with respect to the main body 202, an outer surface of the first support leg 204 and an outer surface of the second support leg 205 may be acted by a force applied by the edge of the hole 403 when the grommet 100 moves downward. The hole 403 applies an inward force to the first support leg 204 and the second support leg 205, thereby bending the first support leg 204 and the second support leg 205. During downward movement of the grommet 100, the first support leg 204 and the second support leg 205 are bent inward to move from the extending position to the retracting position.

As shown in FIG. 4B, when the sealing edge 211 contacts with the upper surface 411 of the car body sheet metal 401, the edge of the hole 403 abuts against the upper end 331 of the first support leg 204 and the upper end 332 of the second support leg 205, and the pair of support legs are in the retracting position. At this time, the distance between the upper end 331 of the first support leg 204 and the upper end 332 of the second support leg 205 is equal to the width L1. Since the first filling portion 233 and the second filling portion 234 are respectively connected to the first support leg 204 and the second support leg 205, the first filling portion 233 and the second filling portion 234 may be deformed inward accordingly. Subsequently, the user continues to apply the downward force to the grommet 100 such that the grommet 100 continuously moves downward until the car body sheet metal 401 passes over the upper end 331 of the first support leg 204 and the upper end 332 of the second support leg 205.

As shown in FIG. 4C, when the car body sheet metal 401 passes over the upper end 331 of the first support leg 204 and the upper end 332 of the second support leg 205, the edge of the hole 403 no longer abuts against the first support leg 204 and the second support leg 205, such that the first support leg 204 and the second support leg 205 are no longer acted by the external force. The first support leg 204 and the second support leg 205, which are no longer acted by the external force, may return back to the extending position from the retracting position (i.e., at this time, the distance between the upper end 331 of the first support leg 204 and the upper end 332 of the second support leg 205 is equal to the width L2). At this time, since the edge of the hole 403 abuts against the first filling portion 233 and the second filling portion 234, and the first filling portion 233 and the second filling portion 234 are elastic, the first filling portion and the second filling portion may deform. The first filling portion 233 and the second filling portion 234 may be deformed such as to fill the gaps between the pair of support legs and the pair of windows while the first support leg 204 and the second support leg 205 are kept in the extending position. In this way, an upper surface of the first support leg 204 and an upper surface of the second support leg 205 abut against a lower surface 412 of the car body sheet metal 401, so as to limit upward movement of the grommet 100, and then prevent the grommet 100 from escaping from the hole 403 upward. In addition, during downward movement of the grommet 100 from a position shown in FIG. 4B to a position shown in FIG. 4C, the car body sheet metal 401 continuously applies a force to the sealing edge 211 of the grommet 100. Since the sealing edge 211 is elastic, the sealing edge may be deformed. The sealing edge 211 may be pressed to abut against the upper surface 411 of the car body sheet metal 401. In this way, the sealing edge 211 may prevent continuous downward movement of the grommet 100. Therefore, the grommet 100 is mounted in place on the car body sheet metal 401, and the car body sheet metal 401 is sandwiched between the neck ring 206 and the support legs.

As an example, after the grommet 100 is fixed to the car body sheet metal 401, the cavity 212 in the grommet 100 may be used to be connected to the car lamp (not shown). Therefore, the grommet 100 may connect the car lamp to the car body sheet metal.

Generally speaking, a car lamp faces an external environment. When it rains or snows, the car lamp may contact with a fluid (for example, water). However, the interior of the car body sheet metal 401 (i.e., below the car body sheet metal 401 shown in FIGS. 4A-4C) is used for arranging components such as an engine, which need to be waterproof. Therefore, the grommet 100 needs to provide a good waterproof performance while serving as a connector.

The grommet 100 provided by the present application may achieve a good sealing performance, which is mainly reflected in the following aspects:

Firstly, the pair of support legs of the grommet 100 may move between the extending position and the retracting position, so as to prevent expansion of the hole 403. Specifically, when the grommet 100 is mounted to the car body sheet metal 401, the pair of support legs may move inward without excessively pressing the hole 403 and accordingly increasing the size of the hole 403, so as to avoid an unnecessary gap between the grommet 100 and the edge of the hole 403 after the grommet 100 is mounted in place.

Secondly, the main body 202 of the grommet 100 itself has a good sealing performance. Specifically, the grommet 100 fills the gaps between the pair of windows and the pair of support legs through the pair of filling portions, such that no communication channel is provided on a side wall of the main body 202, so as to prevent the fluid from flowing from a position above the car body sheet metal 401 to a position below the car body sheet metal 401 through the communication channel on the side wall.

Thirdly, the grommet 100 has a good sealing performance with the hole 403 in the car body sheet metal 401. Specifically, when the grommet 100 is mounted in place on the car body sheet metal 401, the pair of filling portions in the grommet 100 respectively abut against the hole 403. The pair of filling portions are elastic, and may fill the gap between the grommet 100 and the hole 403, thereby realizing the good sealing performance.

Fourthly, the grommet 100 has a good sealing performance with the upper surface 411 of the car body sheet metal 401. Specifically, when the grommet 100 is mounted in place on the car body sheet metal 401, the sealing edge 211 of the grommet 100 abuts against the upper surface 411 of the car body sheet metal 401. The sealing edge 211 is elastic, so as to have a very large contact area with the upper surface 411, and sealing is achieved at the periphery of the hole 403.

Figure 5A:
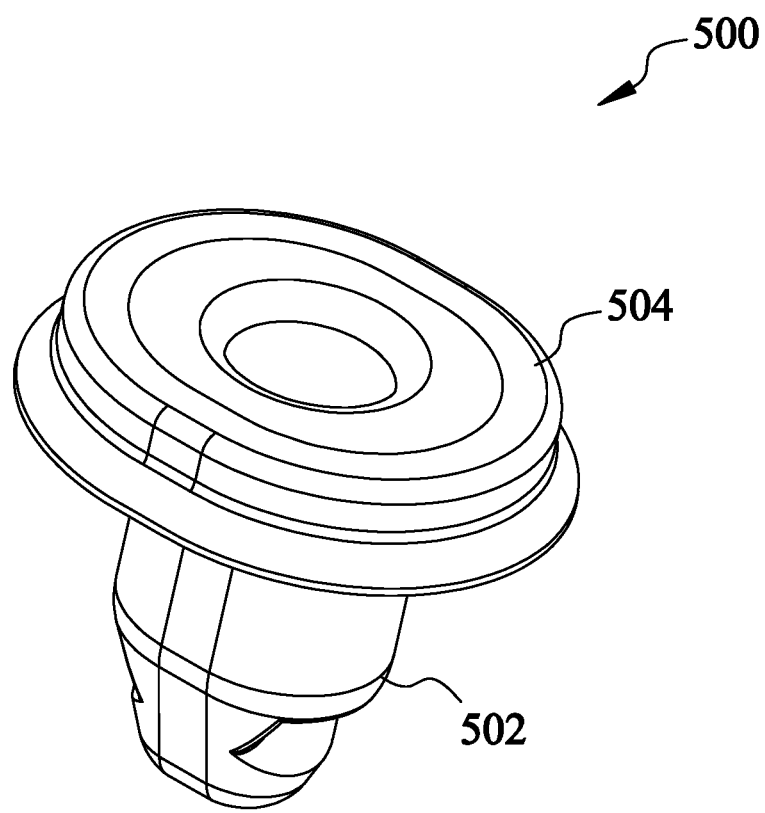
FIG. 5A is a top perspective view of a grommet of a second embodiment of the present application.
Figure 5B:
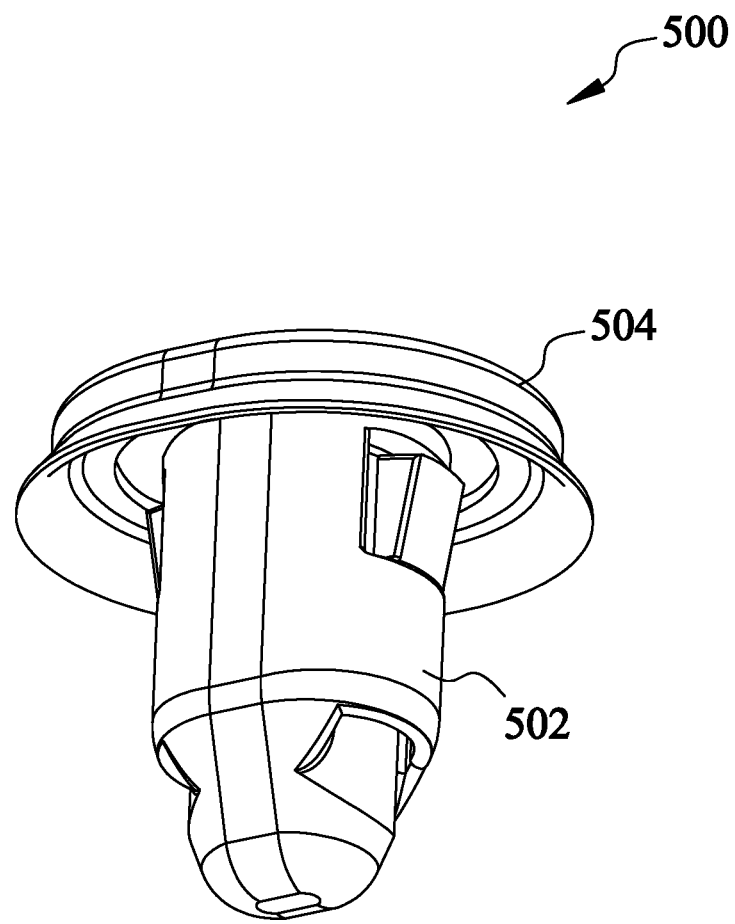
FIG. 5B is a bottom perspective view of the grommet shown in FIG. 5A.

FIG. 5A is a top perspective view of a grommet 500 of a second embodiment of the present application. FIG. 5B is a bottom perspective view of the grommet 500 shown in FIG. 5A. As shown in FIGS. 5A-5B, the grommet 500 comprises a first grommet portion 502 and a cap 504. The cap 504 is provided at an upper portion of the first grommet portion 502. The first grommet portion 502 is integrally molded with a first material, and the cap 504 is integrally molded with a second material. The cap 504 is molded to the first grommet portion 502 to form the grommet 500. As an example, the first material is plastic and the second material is a TPE material (i.e., a thermoplastic elastomer material).

Figure 6A:
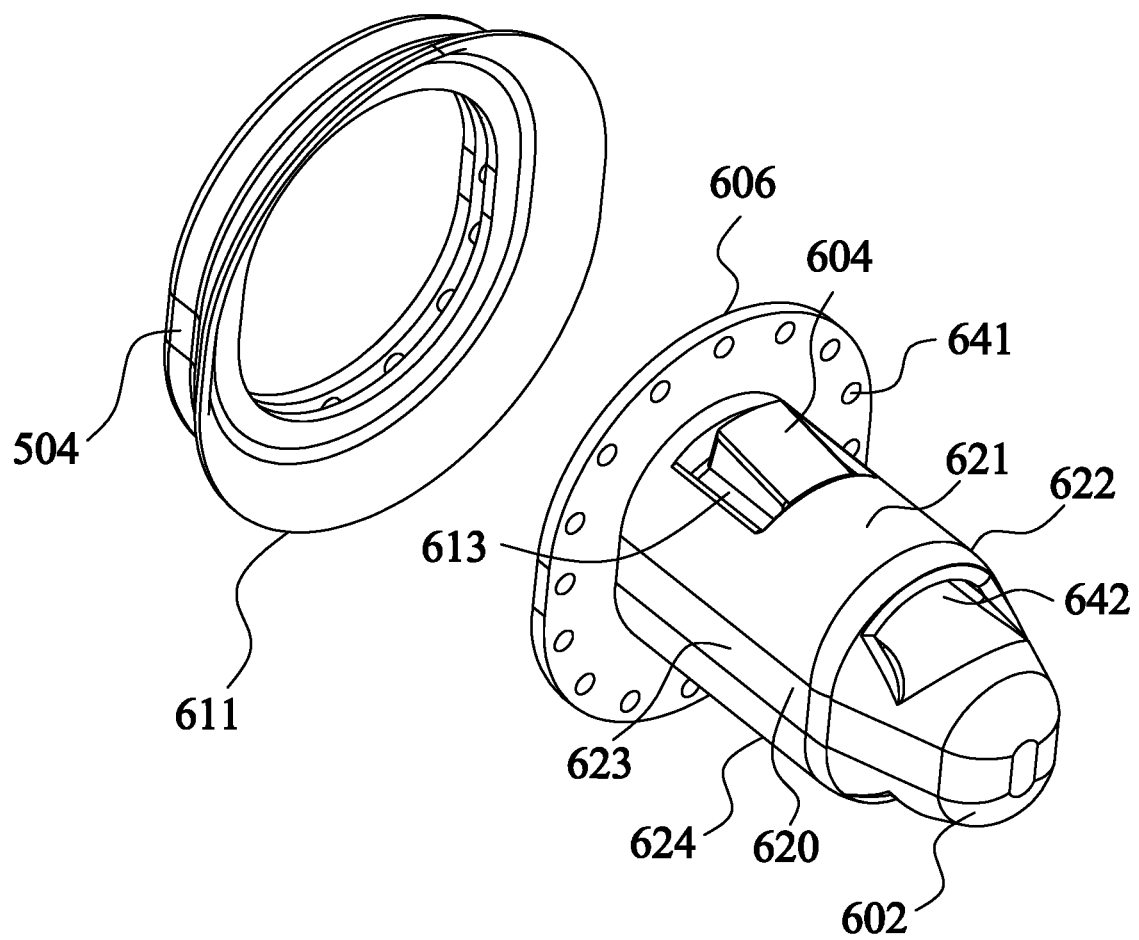
FIG. 6A is an exploded view of the grommet shown in FIG. 5A from a first perspective.
Figure 6B:
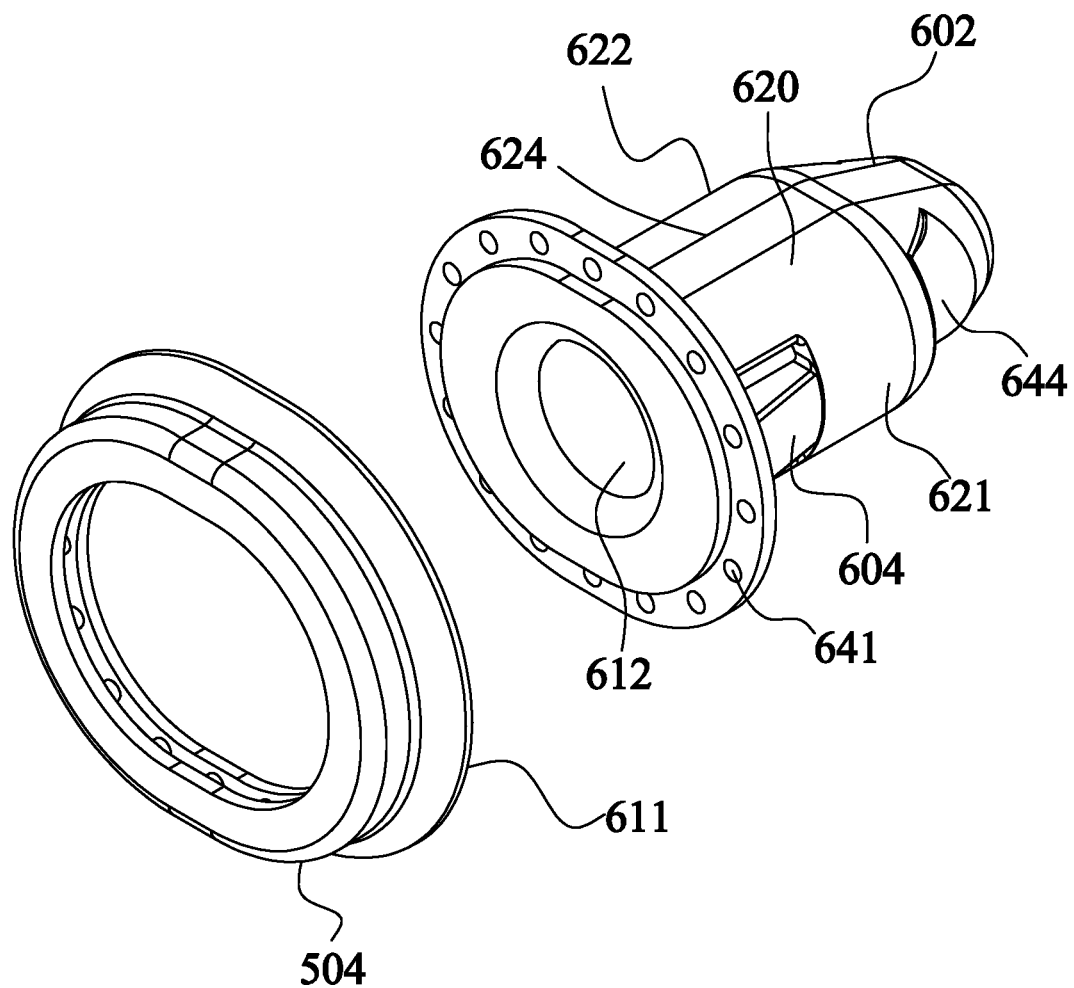
FIG. 6B is an exploded view of the grommet shown in FIG. 5A from a second perspective.
Figure 7A:
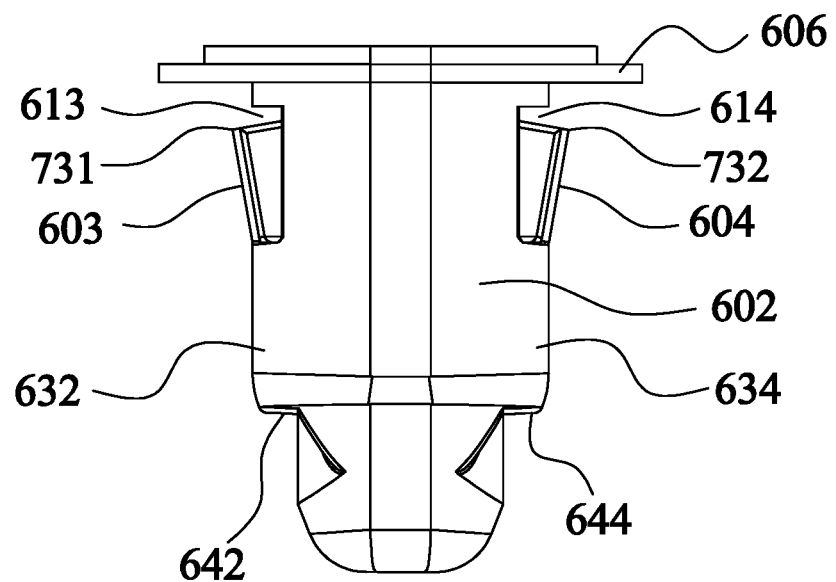
FIG. 7A is a front view of a first grommet portion shown in FIG. 5A.
Figure 7B:
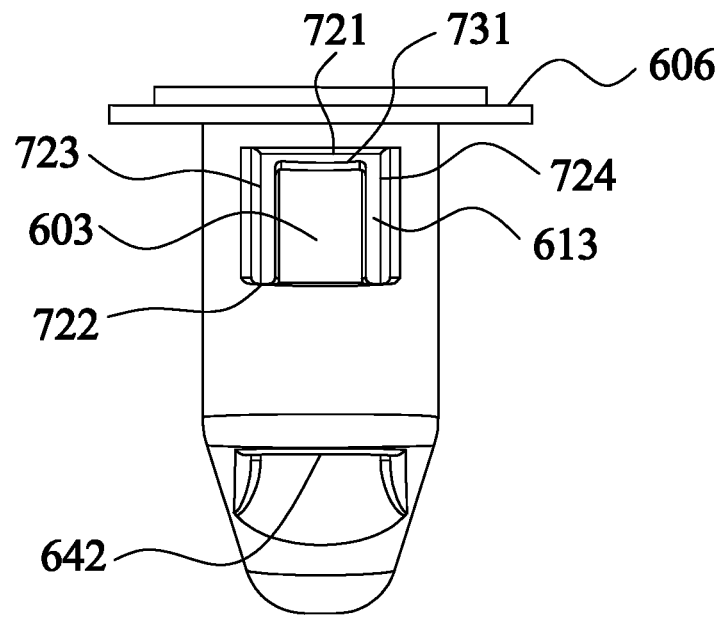
FIG. 7B is a side view of the first grommet portion shown in FIG. 5A.
Figure 8A:
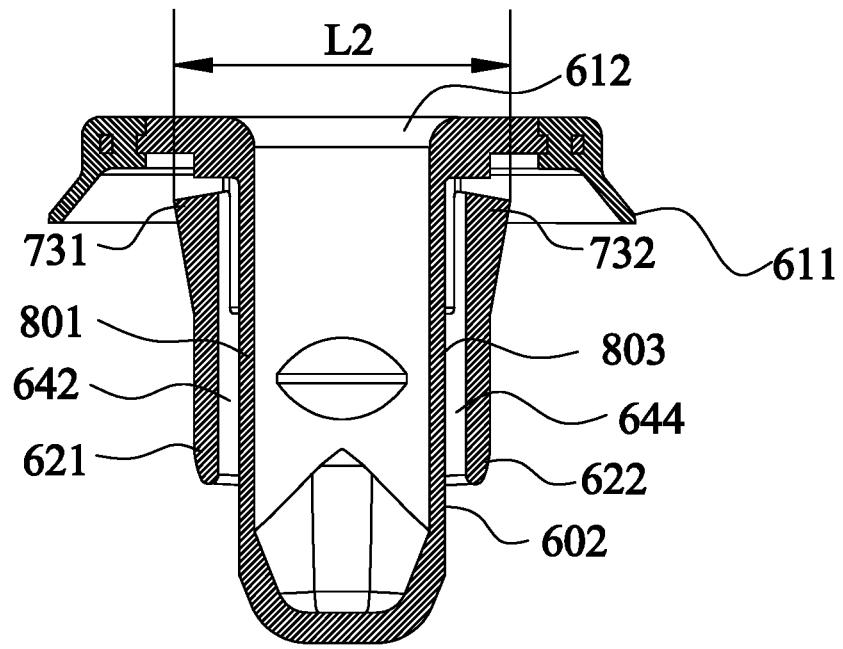
FIG. 8A is a sectional view of the grommet shown in FIG. 5A, in which support legs of the grommet are in extending position.
Figure 8B:
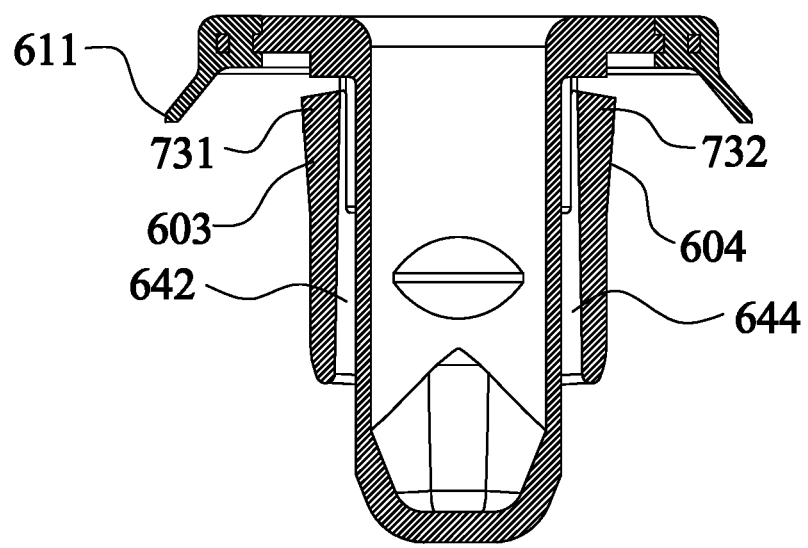
FIG. 8B is a sectional view of the grommet shown in FIG. 5A, in which the support legs of the grommet are in retracting position.

FIG. 6A and FIG. 6B are exploded views of the grommet 500 shown in FIG. 5A from different perspectives. FIG. 7A is a front view of the first grommet portion 502 shown in FIG. 5A. FIG. 7B is a side view of the first grommet portion 502 shown in FIG. 5A. FIG. 8A is an axial sectional view of the grommet 500, in which support legs of the grommet 500 are in extending position. FIG. 8B is a sectional view of the grommet 500, in which the support legs of the grommet 500 are in retracting position, so as to show a specific structure of the grommet 500.

As shown in FIGS. 6A-6B, FIGS. 7A-7B and FIGS. 8A-8B, the first grommet portion 502 comprises a main body 602, an outer wall 620, a pair of support legs and a neck ring 606. The main body 602 is approximately a cylinder extending in a length direction. In the present application, the main body 602 is approximately the cylinder and has an axis extending in the length direction. A lower portion of the main body tapers so as to guide the main body 602 when the main body 602 is mounted to car body sheet metal 901 (see FIGS. 9A-9C). A cavity 612 is axially recessed downward from an upper surface of the main body 602, and is used to be connected to a car lamp (not shown). The outer wall 620 is provided around the main body 602. The outer wall comprises a first outer wall portion 621 and a second outer wall portion 622 which are provided at a first side face 801 and a second side face 803 (see FIG. 8A) opposite each other of the main body 602, and a third outer wall portion 623 and a fourth outer wall portion 624 which are provided at a third side face and a fourth side face opposite each other of the main body 602. The first outer wall portion 621 and the second outer wall portion 622 are respectively spaced from the main body 602 by a certain distance to form a first channel 642 and a second channel 644. The first channel 642 and the second channel 644 are symmetrically provided with respect to the axis of the grommet 500 and with respect to the cavity 612, and respectively extend by a certain distance along the length direction of the main body 602. The third outer wall portion 623 and the fourth outer wall portion 624 are connected to the main body 602. The outer wall 620 is approximately oval in cross section at the periphery, so as to match a hole 903 (see FIG. 9) in the car body sheet metal 901 in shape.

The neck ring 606 horizontally extends outward from an upper portion of the main body 602, and is used for supporting the cap 504. The neck ring 606 is provided with multiple through holes 641, which are uniformly distributed along an outer edge of the neck ring 606, and are used for providing channels for molding the cap 504 to the first grommet portion 502.

The cap 504 is provided on the first grommet portion 502, and is supported on the neck ring 606 in an encircled manner. More specifically, the cap 504 covers an outer edge of the neck ring 606 and extends downward and outward after passing over the outer edge of the neck ring 606 to form a sealing edge 611 at a free end thereof. In a length direction, the sealing edge 611 extending downward of the cap 504 is lower than an upper end 731 and an upper end 732 (as shown in FIGS. 8A-8B) of the pair of support legs, such that the sealing edge 611 of the cap 504 may abut against an upper surface 911 (see FIGS. 9A-9C) of the car body sheet metal 901 when the grommet 500 is mounted in place on the car body sheet metal 901, and is pressed by the upper surface 911 of the car body sheet metal 901 to expand and deform outward, thereby reducing the length.

As shown in FIGS. 7A-7B and FIGS. 8A-8B, the first grommet portion 502 comprises a pair of windows. The pair of windows are a first window 613 and a second window 614. The first window 613 and the second window 614 are respectively provided in the first outer wall portion 621 and the second outer wall portion 622, and are symmetrically provided with respect to the axis of the grommet 500. The first window 613 is provided in the first outer wall portion 621 and transversely penetrates the first outer wall portion 621 to communication with the first channel 642. The second window 614 is provided in the second outer wall portion 622 and transversely penetrates the second outer wall portion 622 to communication with the second channel 644. Each of the first window 613 and the second window 614 comprises an upper edge 721, a lower edge 722, a left edge 723 and a right edge 724. The upper edge 721 and the lower edge 722 are oppositely arranged, and the left edge 723 and the right edge 724 are oppositely arranged.

As shown in FIGS. 7A-7B and FIGS. 8A-8B, the pair of support legs are a first support leg 603 and a second support leg 604. The first support leg 603 and the second support leg 604 are respectively provided in the first window 613 and the second window 614, and are connected to the lower edges of the corresponding windows through the bottoms thereof. Specifically, the first support leg 603 extends upward and outward (i.e., leftward shown in FIG. 7A) out of a portion of the lower edge 722 of the first window 613. The upper end 731 of the first support leg 603 is located below the upper edge 721 of the first window 613, and is spaced from the upper edge 721 by a certain distance, such that when the first support leg 603 is bent inward, the first support leg 603 may be contained in the first window 613. Similarly, the second support leg 604 extends upward and outward (i.e., rightward shown in FIG. 7A) out of a portion of the lower edge 722 of the second window 614. The upper end 732 of the second support leg 604 is located below the upper edge 721 of the second window 614, and is spaced from the upper edge 721 by a certain distance, such that when the second support leg 604 is bent inward, the second support leg 604 may be contained in the second window 614. That is, the first channel 642 and the second channel 644 may respectively provide space for inward bending of the first support leg 603 and the second support leg 604.

Figure 9A:
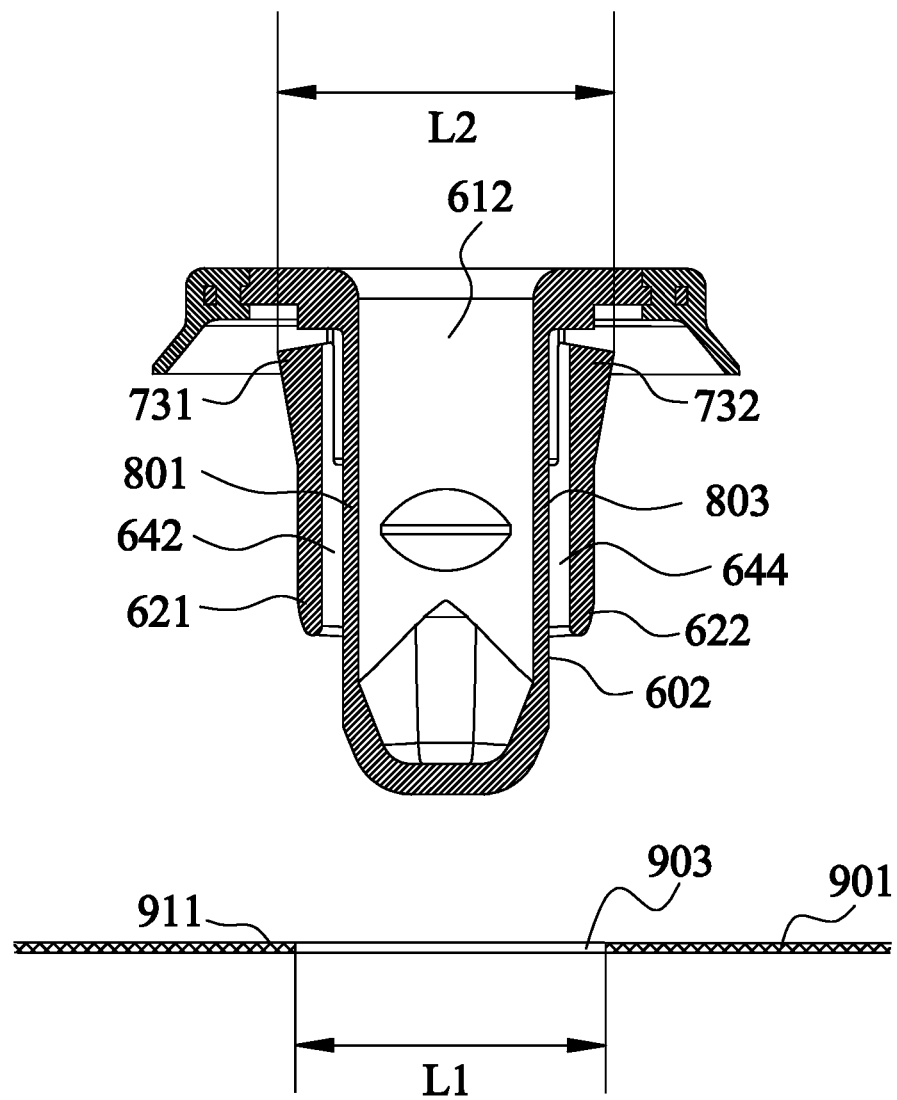
FIG. 9A is a sectional view of mounting the grommet to a car body sheet metal, in which the support legs of the grommet are in the extending position.
Figure 9B:
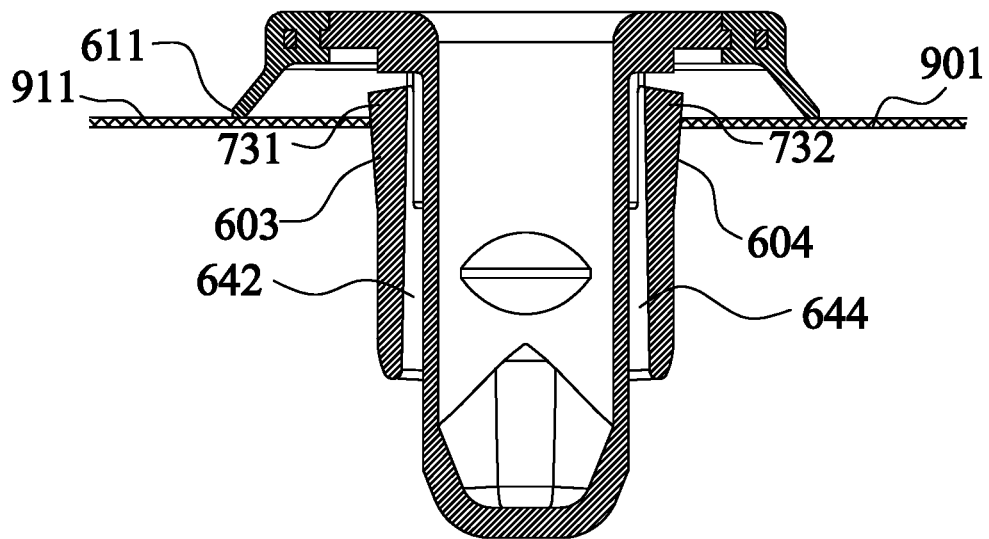
FIG. 9B is a sectional view of mounting the grommet to the car body sheet metal, in which the support legs of the grommet are in the retracting position.
Figure 9C:
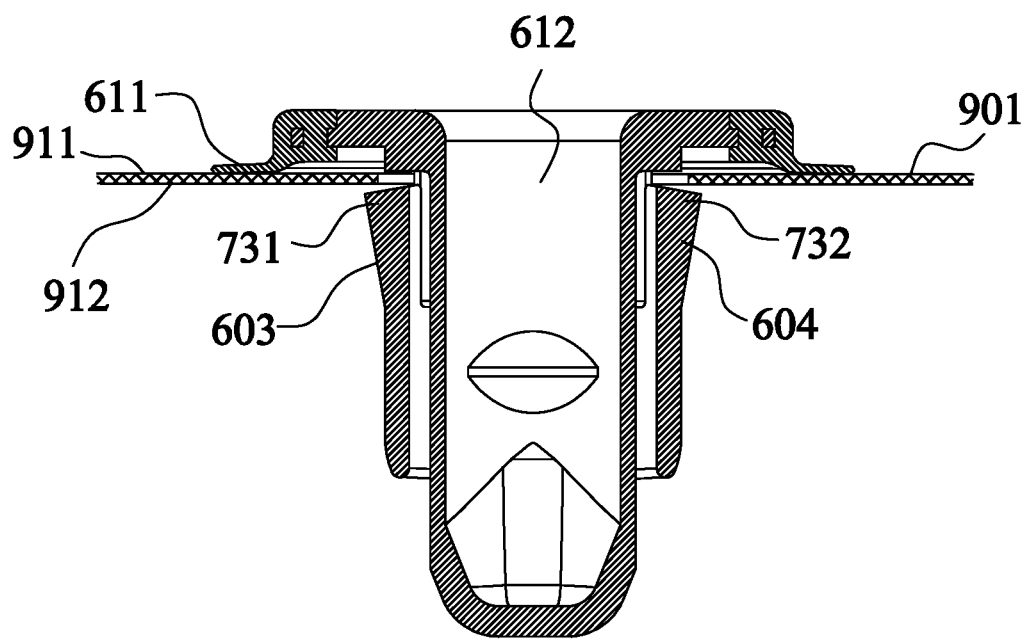
FIG. 9C is a sectional view of the grommet mounted in place on the car body sheet metal and shown in FIG. 5A.

As shown in FIGS. 8A-8B, the pair of support legs have the extending position and the retracting position, and may move between the extending position and the retracting position. Specifically, as shown in FIG. 8A, when the pair of support legs are not acted by an external force, the pair of support legs are oblique outward with respect to the main body 602 (i.e., at an angle with an outer surface of the main body 602), and at this time, the pair of support legs are in the extending position. When the pair of support legs are acted by an inward external force, the upper end 731 and the upper end 732 of the pair of support legs move inward (i.e., toward the cavity 612). As shown in FIG. 8B, when the pair of support legs are respectively contained in a pair of channels (i.e., upper portions of the pair of support legs respectively enter the pair of channels), the pair of support legs are in the retracting position. In addition, when the pair of support legs are no longer acted by the external force, the pair of support legs may return from the retracting position (as shown in FIG. 8B) to the extending position (as shown in FIG. 8A). As shown in FIGS. 9A-9C, the car body sheet metal 901 is provided with a round hole 903 for receiving the grommet 500. The diameter of the round hole 903 is equal to a width L1. When the first support leg 603 and the second support leg 604 in the grommet 500 are not acted by the external force and are in the extending position, a distance between the upper end 731 of the first support leg 603 and the upper end 732 of the second support leg 604 is equal to a width L2. The width L1 is smaller than the width L2.

FIGS. 9A-9C are sectional views respectively showing the status when the pair of support legs are in the extending position, when the pair of support legs are in the retracting position, and when the grommet is mounted in place. As shown in FIG. 9A, the pair of support legs in the grommet 500 are in the extending position without the external force. When the grommet 500 is to be fixed to the car body sheet metal 901, a user may place the grommet 500 above the hole 903, and apply a downward force to the grommet 500. Since the first support leg 603 and the second support leg 604 are oblique outward with respect to the main body 602, an outer surface of the first support leg 603 and an outer surface of the second support leg 604 may be acted by a force applied by the edge of the hole 903 when the grommet 500 moves downward. The hole 903 applies an inward force to the first support leg 603 and the second support leg 604, thereby bending the first support leg 603 and the second support leg 604 inward. During inward bending of the first support leg 603 and the second support leg 604, the pair of support legs move from the extending position to the retracting position.

As shown in FIG. 9B, when the edge of the hole 903 abuts against the upper end 731 of the first support leg 603 and the upper end 732 of the second support leg 604, the pair of support legs are in the retracting position. At this time, the distance between the upper end 731 of the first support leg 603 and the upper end 732 of the second support leg 604 is equal to the width L1. As an example, at this time, the sealing edge 611 may further contact with the upper surface 911 of the car body sheet metal 901. Subsequently, the user continues to apply the downward force to the grommet 500 such that the grommet 500 continuously moves downward until the car body sheet metal 901 passes over the upper end 731 of the first support leg 603 and the upper end 732 of the second support leg 604.

As shown in FIG. 9C, when the car body sheet metal 901 passes over the upper end 731 of the first support leg 603 and the upper end 732 of the second support leg 604, the edge of the hole 903 no longer abuts against the first support leg 603 and the second support leg 604, such that the first support leg 603 and the second support leg 604 are no longer acted by the external force. The first support leg 603 and the second support leg 604, which are no longer acted by the external force, may return to the extending position from the retracting position (i.e., at this time, the distance between the upper end 731 of the first support leg 603 and the upper end 732 of the second support leg 604 is equal to the width L2). At this time, the first support leg 603 and the second support leg 604 abut against a lower surface 912 of the car body sheet metal 901, so as to prevent upward movement of the grommet 500, and then prevent the grommet 500 from escaping from the hole 903 upward. In addition, during downward movement of the grommet 500 from a position shown in FIG. 9B to a position shown in FIG. 9C, the car body sheet metal 901 continuously applies a force to the sealing edge 611 of the grommet 500. Since the sealing edge 611 is elastic, the sealing edge may be deformed. The sealing edge 611 may be pressed to abut against the upper surface 911 of the car body sheet metal 901. In this way, the sealing edge 611 may prevent continuous downward movement of the grommet 500. Therefore, the grommet 500 is mounted in place on the car body sheet metal 901.

Similar to the first embodiment of the present application, as an example, after the grommet 500 is fixed to the car body sheet metal 901, the cavity 212 in the grommet 500 may be used to be connected to the car lamp (not shown). The grommet 500 may provide a good waterproof performance while serving as a connector.

The grommet 500 provided by the present application may realize a good sealing performance, which is mainly reflected in the following aspects:

Firstly, the pair of support legs of the grommet 500 may move between the extending position and the retracting position, so as to prevent expansion of the hole 903. Specifically, when the grommet 500 is mounted to the car body sheet metal 901, the pair of support legs may move inward without excessively pressing the hole 903 and accordingly increasing the size of the hole 903, so as to avoid an unnecessary gap between the grommet 500 and the edge of the hole 903 after the grommet 500 is mounted in place.

Secondly, the main body 602 of the grommet 500 itself has a good sealing performance. Specifically, the cavity in the grommet 500 is formed by the main body 602, such that no communication channel is provided on a side wall of the main body 602, so as to prevent the fluid from flowing from a position above the car body sheet metal 901 to a position below the car body sheet metal 901 through the communication channel on the side wall.

Thirdly, the grommet 500 has a good sealing performance with the upper surface 911 of the car body sheet metal 901. Specifically, when the grommet 500 is mounted in place on the car body sheet metal 901, the sealing edge 611 of the grommet 500 abuts against the upper surface 911 of the car body sheet metal 901. The sealing edge 611 is elastic, so as to have a very large contact area with the upper surface 911, and sealing is achieved at the periphery of the hole 903, thereby forming multiple safeguards of sealing.

In addition, the first grommet portion 502 of the grommet 500 may be integrally molded, thus having the advantages of easy manufacture and low cost. Specifically, when a molding process is used, a mold needs to be separated from a product in an up-down direction. In the grommet 500 of the present application, the pair of channels are provided outside the main body 602, thereby providing space for bending the pair of support legs inward. In addition, the pair of channels extend vertically, such that the first grommet portion 502 may be integrally molded.

Although only some features of the present application are illustrated and described herein, those skilled in the art may make various improvements and changes. Therefore, it should be understood that the appended claims are intended to encompass all the above improvements and changes that fall within the substantial spirit and scope of the present application.

I claim:

1. A grommet, comprising:
   a main body extending along an axis of the grommet;
   a cavity recessed downward from an upper surface of the main body along the axis;
   an outer wall provided around the main body and provided with a first outer wall portion and a second outer wall portion which are respectively located outside a first side face and a second side face opposite each other of the main body a first channel being formed between the first outer wall portion and the first side face of the main body and a second channel being formed between the second outer wall portion and the second side face of the main body;
   a pair of windows respectively provided in the first outer wall portion and the second outer wall portion and being respectively in communication with the first channel and the second channel;
   a pair of support legs respectively connected to lower edges of the pair of windows through bottoms thereof; and
   a neck ring provided around the main body and extending outward from a top of the main body the neck ring being located above the pair of windows and the pair of support legs,
   wherein the pair of support legs have an extending position and a retracting position, the pair of support legs move between the extending position and the retracting position, and the pair of support legs are configured such that tops of the pair of support legs are located outside the corresponding windows when the pair of support legs are in the extending position, and the pair of support legs are respectively contained in the pair of windows when the pair of support legs are in the retracting position.

2. The grommet according to claim 1, wherein the pair of support legs are configured such that the pair of support legs obliquely extend upward and outward with respect to the main body when the pair of support legs are in the extending position.

3. The grommet according to claim 2, wherein the main body, the outer wall, the pair of support legs and the neck ring are integrally molded with a first material.

4. The grommet according to claim 1, further comprising:
   a cap, wherein the cap is provided around the neck ring, and is connected to the neck ring and is provided with a sealing edge at a free end thereof.

5. The grommet according to claim 4, wherein the sealing edge is lower than the tops of the pair of support legs.

6. The grommet according to claim 4, wherein the cap is integrally molded with a second material, and
   wherein the cap is molded to the main body, and forms the grommet together with the outer wall, the pair of support legs and the neck ring.

7. The grommet according to claim 1, wherein the pair of windows and the pair of support legs are symmetrically provided with respect to the axis of the grommet, respectively.

8. The grommet according to claim 1, wherein the grommet is used for being mounted to a car body sheet metal, the car body sheet metal is provided with a round hole; and
   wherein the grommet is configured such that a distance between the tops of the pair of support legs is greater than a diameter of the round hole when the pair of support legs are in the extending position, and the distance between the tops of the pair of support legs is less than or equal to the diameter of the round hole when the pair of support legs are in the retracting position.

9. The grommet according to claim 8, wherein the grommet is configured such that the car body sheet metal is sandwiched between the neck ring and the pair of support legs when the grommet is mounted in place on the car body sheet metal.

* * * * *